Patented Nov. 21, 1950

2,531,373

UNITED STATES PATENT OFFICE 2,531,373

PROCESS OF REFRIGERATION

Herbert Waterman, deceased, late of Los Angeles, Calif., by Beatrice Joy Waterman, executrix, Los Angeles, Calif., assignor, by mesne assignments, to Minnesota Mining & Manufacturing Company, St. Paul, Minn., a corporation of Delaware No Drawing. Original application December 8, 1945, Serial No. 633,857. Divided and this application February 28, 1949, Serial No. 78,887

2 Claims. (Cl. 62—178)

This invention relates to a new chemical compound trifluorobromomethane, $CF_3Br$ and to a method of preparation of this compound.

While any skilled chemist can write the formula for this compound and while various workers in the art have attempted to prepare trifluorobromomethane, so far as I am aware no one heretofore has succeeded in manufacturing this material, no mention of it is contained in Beilstein or Chemical Abstracts. The authoritative work of Albert L. Henne on Aliphatic fluorides (chapter 11, Gilman Organic Chemistry, vol. I, John Wiley and Sons, New York, 1943), exhaustively discusses all known aliphatic fluorides without listing trifluorobromomethane. In a later work (Organic Reactions, vol. 2, John Wiley and Sons, New York, 1944) Henne discusses the preparation of aliphatic fluorides and lists all known compounds recorded anywhere in the literature up to January 1, 1941 (pages 76–91 inclusive). The only fluorobromoethanes listed by Henne are the following: $CFBr_3$, $CF_2Br_2$, $CHFBrCl$, $CHFBr_2$, $CHF_2Br$, $CH_2FBr$.

Simons, Bond & MacArthur studied the preparation and properties of certain fluoromethyl compounds and attempted to prepare trifluorobromomethane (Journal of the American Chemical Society, pages 3477, 3480, December 1940). They did not succeed in preparing either the trifluorobromomethane or the trifluoroiodamethane and their conclusion, as stated by them, was as follows:

"Trifluorobromomethane and trifluoroiodamethane are judged to be unstable after numerous attempts at their preparation." He has succeeded in manufacturing trifluorobromomethane, $CF_3Br$, and has found that it has the following physical properties:

Its boiling point is −58.67° C. or −73.6° F. at 760 mm. Hg pressure; its freezing point is −166° C; its critical temperature is 66.6° C; its critical pressure is 565 pounds per square inch absolute; the logarithm of its vapor pressure (P), in pounds per square inch absolute, is equal to 5.441 minus 1650 times the reciprocal of the temperature (T) in degrees Rankine or log $$P = 5.441 - 1650\left(\frac{1}{T}\right)$$

its liquid density is as follows: at 0° F. and 71.1 pounds per square inch absolute, 1.802; at 50° F. and 160.4 pounds per square inch absolute, 1.665; at 100° F. and 311.7 pounds per square inch absolute, 1.456; its vapor density at 25° C. and 745 mm. Hg pressure is 5.972 grams per liter; the specific heat of the liquid between 3° and 30° C. is 0.196 B. t. u. per pound per degree F.; its latent heat of vaporization at the normal boiling point is 54 B. t. u. per lb.; the ratio of heat capacity at constant pressure (Cp) to the heat capacity at constant volume (Cv) at 25° C. is 1.116, that is $Cp/Cv = 1.116$ at 25° C. It will be obvious to those skilled in the art that by reason of these properties, trifluorobromomethane is quite useful as a heat transfer medium, particularly as a refrigerant for an addition to the characteristics noted, the material is non-inflammable and is non-toxic to humans. It has a pleasant aromatic odor. The foregoing properties were determined on apparatus of such accuracy that the values given are suitable only for commercial utilization of the material; they are not of that accuracy usually associated with the values of pure science and to which the term scientific accuracy is applied.

To prepare the material a steel pressure vessel was made of a piece of 3 inch standard black iron pipe, 12 inches long threaded at each end. At its bottom end it was closed with a threaded cap. At its top, a three inch to half inch bell reducer was fitted. A thermometer well of one-eighth inch pipe was brazed to the outside of the pipe near the bottom. A reflux condenser consisting of a four foot length of half inch pipe was threaded for attachment to the bell reducer. The half inch pipe carried two separate water jackets, each approximately two feet in length and each of two and one-half inch diameter, the jackets being held in place with rubber stoppers. At the top of the half inch pipe a T fitting was placed carrying a suitable pressure gauge and a needle valve. Suitable attachments were provided for circulating tap water through the lower water jacket and ice cooled water through the upper water jacket.

A mixture consisting of five mols (1658.35 grams) of carbon tetrabromide was intimately mixed with seven and one-half mols (1340.70 grams) of anhydrous sublimed crystals of antimony trifluoride. This mixture was placed in the pressure vessel and the bell reducer screwed into place. One and one-half mols of dry bromine (239.74 grams) were then added to the vessel and the reflux condenser was attached.

The pressure vessel was then heated to a temperature between 180° and 200° C. while the pressure was maintained between 60 and 80 pounds gauge by adjusting the steel needle valve carried by the T. The heating under pressure was continued until no more gas was given off by the reaction mixture, approximately 24 hours. The gas derived from the reflux condenser was scrubbed through two caustic scrubbers, dried and condensed with Dry Ice. The crude mixture recovered consisted of ninety five mol percent of trifluorobromomethane and five percent of difluorodibromomethane. This crude material was then fractionated, three and one-half gram mols of trifluorobromomethane being finally recovered after fractionation in a four foot vacuum jacketed column packed with one-eighth inch single turn Pyrex helices to fill the ten millimeter diameter column.

This is a division of application Ser. No. 633,857, filed December 8, 1945.

What is claimed is:

1. The process of transferring heat comprises condensing trifluorobromomethane and then evaporating the trifluorobromomethane in the vicinity of a body to be cooled.

2. The process of producing refrigeration which comprises evaporating $CF_3Br$ in the vicinity of a body to be cooled and subsequently condensing the $CF_3Br$.

BEATRICE JOY WATERMAN.
*Executrix of the Last Will and Testament of Herbert Waterman.*

REFERENCES CITED

The following references are of record in the file of this patent:

UNITED STATES PATENTS

| Number | Name | Date |
|---|---|---|
| Re. 19,265 | Midgley et al. | Aug. 7, 1934 |